A. B. FIELD.
DYNAMO ELECTRIC MACHINE.
APPLICATION FILED MAY 13, 1907.
902,065.
Patented Oct. 27, 1908.
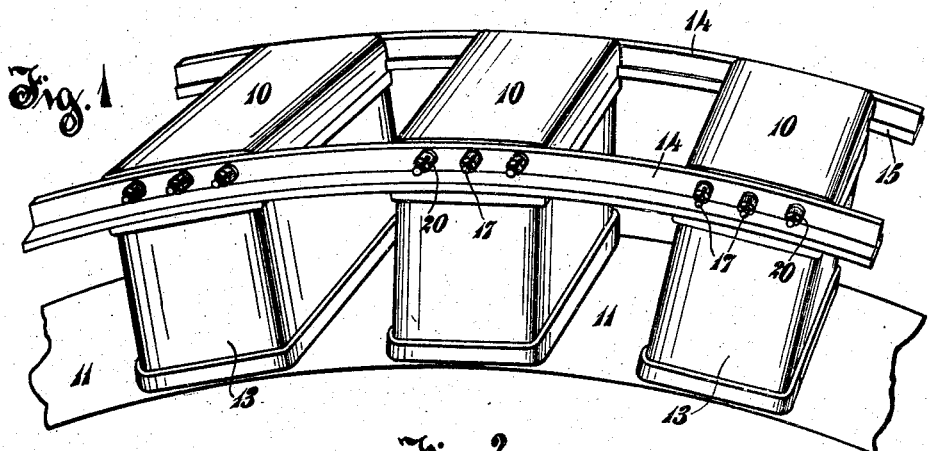
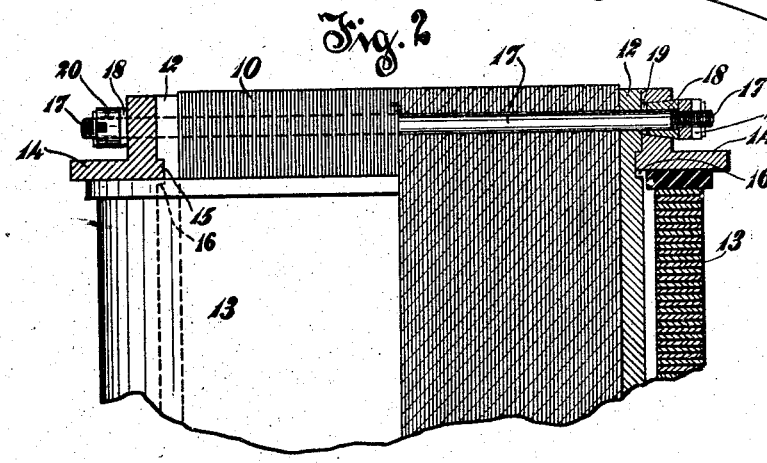
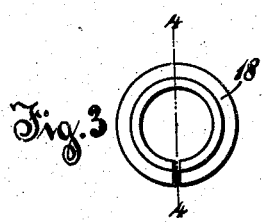
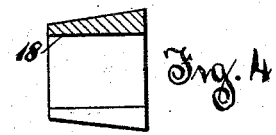
Witnesses
Inventor
Allan B. Field
By Chas. E. Lord
Attorney

UNITED STATES PATENT OFFICE.

ALLAN B. FIELD, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 902,065.    Specification of Letters Patent.    Patented Oct. 27, 1908.

Application filed May 13, 1907. Serial No. 373,493.

*To all whom it may concern:*

Be it known that I, ALLAN B. FIELD, a subject of the King of England, residing at Norwood, in the county of Hamilton and State of Ohio, have invented certain new and useful Improvements in Dynamo-Electric Machines, of which the following is a full, clear, and exact specification.

My invention relates to means for preventing hunting in dynamo-electric machines.

When electric generators are driven by unsteady sources of power, or when synchronous motors are connected to fluctuating loads, there is a tendency for the machines to rotate at a non-uniform speed. The hunting or periodic forward and backward displacement from a true synchronous speed is often progressive and produces many undesirable consequences, especially when there are two or more machines operating in parallel. In order to overcome this hunting it has been proposed to mount on the outer extremities of the field pole-pieces of the machine and on opposite sides thereof two conducting rings extending entirely around the machine, and to connect these rings electrically by rods of conducting material which pass through the pole-pieces. Upon any tendency to hunt there is an accompanying tendency to variation in the cross magnetizing flux of the machine, which tends to set up currents in said rings and rods in opposition to the variations in said cross magnetizing flux, and thereby to prevent the hunting. To obtain the most satisfactory results it is essential that the resistance of the paths of these opposing currents shall be low. Generally heretofore, however, in the structures embodying the above feature the connections between the rods and the rings have been very imperfect, thereby greatly diminishing the efficiency of the arrangement.

It is the object of my present invention to improve these previous structures so that the hunting may be more completely damped and further to utilize the rings to give greater rigidity to the field structures and retain the field coils in place.

The novel features of my invention will be apparent from the description and drawings and will be particularly pointed out in the claims.

Figure 1 shows in perspective a portion of the rotating field magnets of a dynamo-electric machine embodying my invention; Fig. 2 is a partly sectional elevation of part of one of the field pole-pieces; Fig. 3 is an end view of the conical sleeve between the rods and rings; and Fig. 4 is a section along the line 4—4 of Fig. 3.

The laminated pole-pieces 10 of the rotary field member of a dynamo-electric machine are mounted in any desired manner on the spider 11. The laminæ of each pole-piece lie between two end-plates 12. The coils 13 are here shown as being composed of edgewise-wound metallic ribbon. The field coils are retained in place and the field pole-pieces are braced by rings 14 which are placed on either side of said pole-pieces and extend entirely around the rotor. These rings are preferably made of brass or other good conducting material and are approximately L-shaped in cross-section. Flanges 15 from these rings engage notches 16 in the plates 12.

One or more rods 17, also of brass or other good conducting material, extend transversely through each of the pole-pieces and through the rings 14. A split sleeve 18, frusto-conical exteriorly, fits snugly over each end of each rod 17 and into a corresponding opening 19 in the ring 14. By means of nuts 20 which engage threads on the ends of the rods 17 the rings 14 may be brought snugly up against end plates 12 and the sleeves 18 forced firmly into the openings 19, wedging the sleeves firmly into both electrical and mechanical contact with the rings 14. With this arrangement there is practically no resistance in the joints between the rods 17 and the rings 14. There is, therefore practically no opposition to the flow of strong anti-hunting currents and any tendency to hunt is immediately and effectively damped out.

Many modifications in the arrangements here shown and described may be made without departing from the spirit and scope of my invention and all such I aim to cover in the following claims.

What I claim as new is:—

1. In a dynamo-electric machine, a plurality of field pole-pieces, coils therefor, conducting rings for bracing said pole-pieces and for retaining said coils in place, and conducting rods passing through said pole-pieces and electrically connecting said rings.

2. In a dynamo-electric machine, a plurality of field pole-pieces, coils thereon, conducting rings for bracing said pole-pieces and for retaining said coils in place, conducting rods passing through said pole-pieces and electrically connecting said rings, and means for making a wedging connection between said rods and said rings.

3. In a dynamo-electric machine, a rotary field member having radiate pole-pieces, coils thereon, conducting rods extending through the pole-pieces, and combined conducting braces and coil retainers electrically connected to said rods and secured to the outer ends of each pair of adjacent pole-pieces by said rods.

4. In a dynamo-electric machine, a rotary field member having radially extending field poles, coils on said field poles, damper rods extending through said field poles, and unitary means for electrically connecting the ends of said rods, for bracing the field poles, and for retaining the field coils in place.

5. In a dynamo-electric machine, a rotary field member having radiate field poles, coils on said poles, damper rods extending through said poles, and a conducting ring on each side of said poles for bracing the latter, retaining the field coils in place, and electrically connecting the damper rods.

In testimony whereof I affix my signature, in the presence of two witnesses.

ALLAN B. FIELD.

Witnesses:
GEO. B. SCHLEY,
FRED J. KINSEY